No. 783,719. PATENTED FEB. 28, 1905.
L. W. CAMPBELL.
POWER TRANSMITTING MECHANISM FOR MOTOR VEHICLES.
APPLICATION FILED MAY 4, 1904.

2 SHEETS—SHEET 1.

WITNESSES:
F. D. Sweet
C. C. Stecher

INVENTOR:
L. W. Campbell
By Wright Brown & Quinby
Attys

No. 783,719. PATENTED FEB. 28, 1905.
L. W. CAMPBELL.
POWER TRANSMITTING MECHANISM FOR MOTOR VEHICLES.
APPLICATION FILED MAY 4, 1904.
2 SHEETS—SHEET 2.
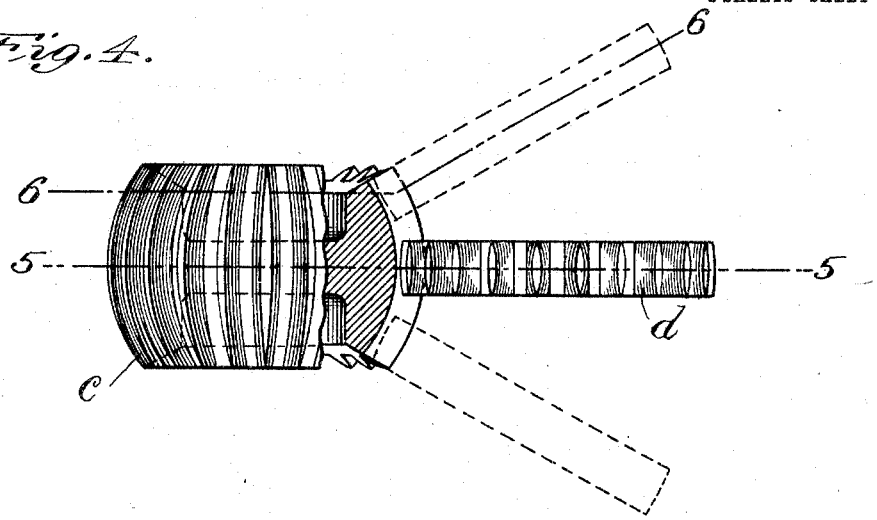
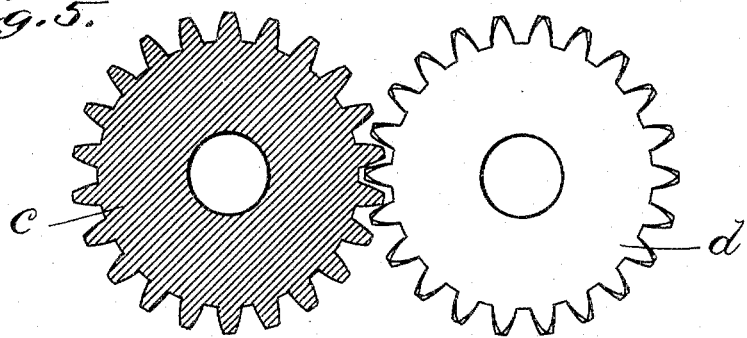
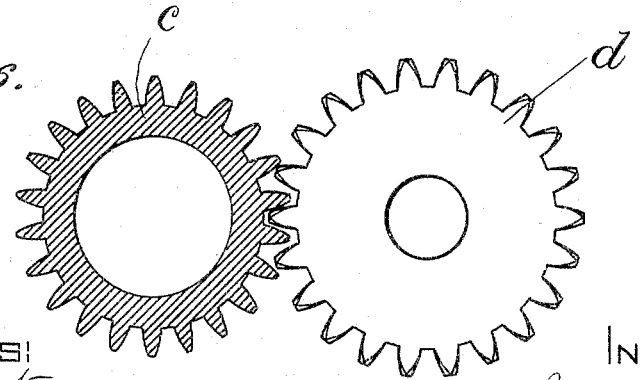
WITNESSES:
F. D. Sweet.
C. C. Stecher.
INVENTOR:
L. W. Campbell
By Wight Brown & Quinby
Attys.

No. 783,719.

Patented February 28, 1905.

UNITED STATES PATENT OFFICE.

LEON W. CAMPBELL, OF WOONSOCKET, RHODE ISLAND.

POWER-TRANSMITTING MECHANISM FOR MOTOR-VEHICLES.

SPECIFICATION forming part of Letters Patent No. 783,719, dated February 28, 1905.

Application filed May 4, 1904. Serial No. 206,332.

*To all whom it may concern:*

Be it known that I, LEON W. CAMPBELL, of Woonsocket, in the county of Providence and State of Rhode Island, have invented certain new and useful Improvements in Power-Transmitting Mechanism for Motor-Vehicles, of which the following is a specification.

This invention relates to means for transmitting power from one shaft to another, the driven shaft being movable endwise in the arc of a circle relatively to the driving-shaft. The invention relates particularly to means for transmitting power from the driving-axle of a motor-vehicle to the shafts or axles of the steering-wheel.

The invention has for its object to provide simple and effective means for imparting motion from a driving-shaft to a driven shaft in such manner as to obviate the necessity of using differential gearing and to provide a compact form of connecting or power-transmitting mechanism which can be readily boxed in and protected from mud and dirt.

The invention consists in a power-transmitting mechanism comprising a driving-shaft, a driven shaft, which is movable endwise in a segmental path relatively to the driving-shaft, and intermeshing gears affixed to said shafts and formed to permit the described endwise movement of the driven shaft without affecting the operative connection between the gears.

Figure 1:
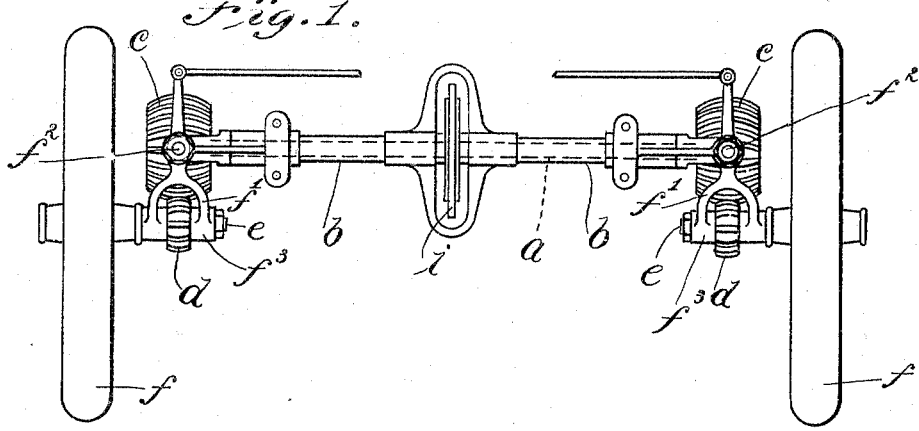
Figure 2:
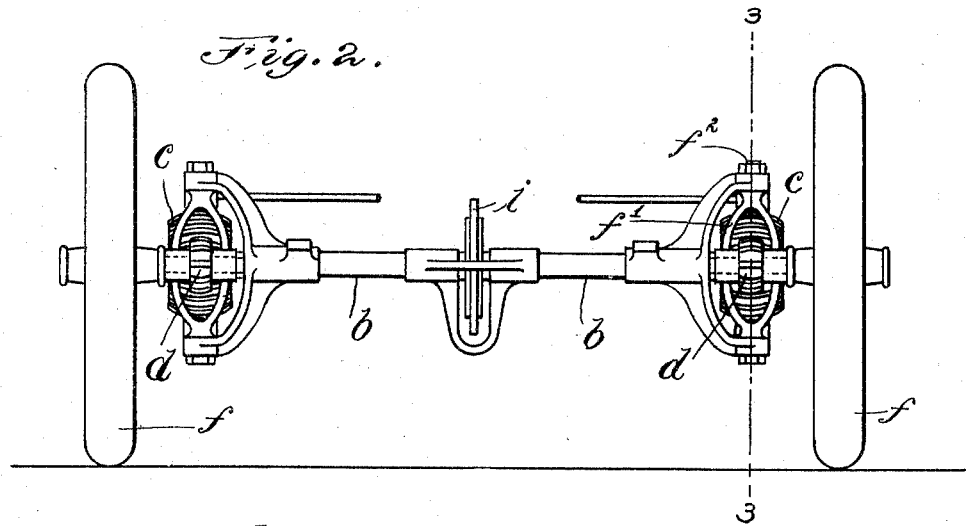
Figure 3:
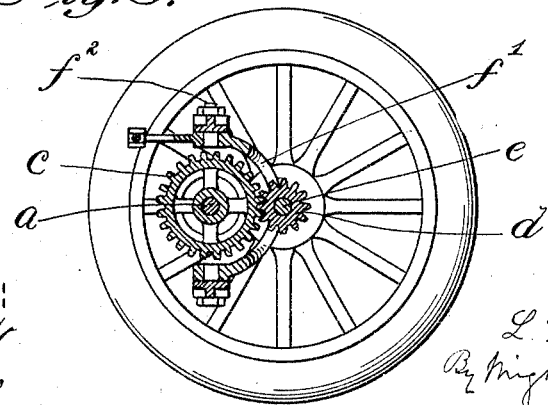

Of the accompanying drawings, Figure 1 represents a top view of the driving shaft or axle and the steering-wheels of a motor-vehicle embodying my invention. Fig. 2 represents a front elevation of the parts shown in Fig. 1. Fig. 3 represents a section on line 3 3 of Fig. 2. Fig. 4 represents a side view, partly in section, showing the gears detached from the shafts. Fig. 5 represents a section on line 5 5 of Fig. 4. Fig. 6 represents a section on line 6 6 of Fig. 4.

The same letters of reference indicate the same parts in all of the figures.

In the drawings, $a$ represents the front axle or driving-shaft of a motor-vehicle, the same being journaled in the usual or any suitable bearings $b$ $b$, connected with the frame of the vehicle. The shaft $a$ is constructed so that it rotates as a single part, or, in other words, it is not divided into two independent sections. To the end of the shaft I affix gears $c$ $c$, each of which is formed as a segment or zone of a sphere, the teeth of the gear being segmental, as clearly shown in Fig. 4.

$d$ $d$ represents gears which intermesh with the gear $c$ and are affixed to the shafts or axles $e$ $e$, on which the steering-wheels $f$ $f$ are mounted. The shafts $e$ $e$ are journaled in bearings $f^3$ $f^3$, having yokes or extensions $f'$, which are pivoted at $f^2$ to arms or brackets affixed to the bearings of the driving-shaft, so that the axles of the steering-wheels have the usual endwise movement in a segmental path relatively to the driving-shaft. The gears $d$ $d$ are relatively narrow—that is to say, the teeth are considerably shorter than the segmental teeth of the gears $c$. The form of the gears $c$ and $d$, as illustrated in the drawings, is such that the gears $d$ are adapted to occupy the various angular positions relatively to the gears $c$ (indicated by full and dotted lines in Fig. 4) without affecting the operative connection between the gears. Hence movement may be imparted from the driving-shaft to the steering-wheel through said gears when the steering-wheels are at any angle that may be required in steering the vehicle.

It will be seen that the gears $c$ and $d$ constitute a very simple and effective connection between the driving-shaft and the steering-wheel shafts compensating for all the relative movements of the steering-wheel. This improved connection between the shafts enables the driving-shaft to be rotated at a unit or single part by power imparted through a spur-gear or sprocket-wheel $i$ affixed to the shaft and obviates the necessity of dividing the shaft and employing differential gears.

I claim—

1. A motor-vehicle running-frame, comprising a transverse tubular member adapted to support one end of the vehicle-body, an extension fork or yoke affixed to each end of said member, a driving-axle adapted to rotate in said member and having projecting ends within said yokes, partially spherical driving-gears affixed to the ends of said axle, steering-yokes vertically pivoted to said extension-yokes on lines passing through the centers of said gears, wheel-axles journaled in said steering-yokes and adapted to stand normally in alinement with each other and parallel to said driving-axle, each wheel-axle having affixed thereto a traction-wheel and a pinion intermeshing with its adjacent driving-gear, and means connecting said steering-yokes whereby they may be simultaneously swung about their pivots.

2. A motor-vehicle running-frame, comprising a transverse tubular member adapted to support one end of the body, a driving-shaft mounted to rotate in said tubular member and projecting therefrom at each end, a spur-gear in the form of the central zone of a sphere, affixed to each end of said shaft, wheel-axles supported adjacent to said gears and normally in alinement with each other and parallel to said driving-axle but adapted to swing in a horizontal plane on an arc of which the center is coincident with that of said spur-gears, spur-pinions affixed to said wheel-axles and adapted to intermesh with said wheel-axles, and means connecting said wheel-axles whereby they may be simultaneously swung in their respective arcs without deranging the intermeshed relation of said spur-pinions to said spur-gears.

3. A power-transmitting mechanism comprising a driving-shaft, a driven shaft, movably supported with relation to the driving-shaft, and intermeshing spur-gears affixed to said shafts, one of said gears being elongated and having a varying diameter which decreases from the center to the ends giving the teeth a segmental form, while the other gear is relatively narrow and is movable in a path substantially parallel with the segmental teeth with which it is engaged.

4. A power-transmitting mechanism comprising a single driving-shaft, two gears affixed thereto and having segmental or longitudinally convex teeth, and driven shafts journaled in pivoted bearings and provided with gears which mesh with the gears on the driving-shaft.

In testimony whereof I have affixed my signature in presence of two witnesses.

LEON W. CAMPBELL.

Witnesses:
R. M. PIERSON,
C. C. STECHER.